(12) United States Patent
Albrecht et al.

(10) Patent No.: US 7,425,353 B2
(45) Date of Patent: Sep. 16, 2008

(54) ENHANCEMENT OF MAGNETIC MEDIA RECORDING PERFORMANCE USING ION IRRADIATION TO TAILOR EXCHANGE COUPLING

(75) Inventors: Manfred Albrecht, Isny-Rohrdorf (DE); Charles Thomas Rettner, San Jose, CA (US); Bruce David Terris, Sunnyvale, CA (US); Thomas Thomson, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 10/768,347

(22) Filed: Jan. 29, 2004

(65) Prior Publication Data

US 2005/0170212 A1    Aug. 4, 2005

(51) Int. Cl.
*C23C 14/04* (2006.01)
*B05D 5/12* (2006.01)

(52) U.S. Cl. .................. 427/523; 427/526; 427/130; 148/100; 148/239

(58) Field of Classification Search .................. 148/121, 148/122; 29/603.08; 427/528, 130; 117/92, 117/108
See application file for complete search history.

(56) References Cited

U.S. PATENT DOCUMENTS

| | | | | |
|---|---|---|---|---|
| 4,481,042 | A * | 11/1984 | Takigawa et al. | ............. 438/298 |
| 5,834,085 | A | 11/1998 | Lairson et al. | |
| 6,331,364 | B1 * | 12/2001 | Baglin et al. | ................. 428/830 |
| 6,368,425 | B1 * | 4/2002 | Segar et al. | .................. 148/239 |
| 6,383,597 | B1 * | 5/2002 | Fullerton et al. | ......... 428/836.1 |
| 6,605,321 | B1 * | 8/2003 | Ravelosona-Ramasitera et al. ................................................................ 427/528 |
| 2001/0018107 | A1 | 8/2001 | Ishii | |

FOREIGN PATENT DOCUMENTS

| | | | |
|---|---|---|---|
| JP | 61133030 A | 6/1986 |
| JP | 11110757 A | 4/1999 |

OTHER PUBLICATIONS

Chappert et al., "Planar PAtterned Magnetic Media Obtained by Ion Irraditation", Jun. 1998, Science, vol. 280, pp. 1919-1922.*
Y. Sonobe et al., "Thermal Stability and SNR of Coupled Granular/Continuous Media," IEEE Transactions On Magnetics, vol. 37, No. 4, pp. 1667-1670, Jul. 2001.
Y. Sonobe et al., "Thermally Stable CGC Perpendicular Recording Media With Pt-Rich CoPtCr and Thin Pi Layers," IEEE Transactions On Magnetics, vol. 38, No. 5, pp. 2006-2001, Sep. 2000.
"SRIM—2003, The Stopping and Range of Ions in Matter," http://www.srim.org/SRIM/SRIM2003.htm, printed Sep. 25, 2003, 11:27 AM, 2 pages.

* cited by examiner

*Primary Examiner*—Holly Rickman
(74) *Attorney, Agent, or Firm*—Joseph P. Curtin, L.L.C.

(57) ABSTRACT

Magnetic medium recording performance can be enhanced by irradiating a magnetic medium with ions having an acceleration voltage of between 10 keV and 100 keV to induce exchange coupling between grains of the magnetic medium. The magnetic medium is exposed to a cumulative ion dosage of between $10^{13}$ ions/cm$^2$ and $10^{17}$ ions/cm$^2$ using a non-patterned exposure of the magnetic medium. The ions can be selected from the group consisting of $H^+$, $He^+$, $Ne^+$, $Ar^+$, $Kr^+$, and $Xe^+$. Alternatively, the ions can be selected from the group consisting of $Ga^+$, $Hg^+$, and $In^+$.

17 Claims, 8 Drawing Sheets

ENHANCEMENT OF MAGNETIC MEDIA RECORDING PERFORMANCE USING ION IRRADIATION TO TAILOR EXCHANGE COUPLING

BACKGROUND OF THE INVENTION

1. Field of the Invention

The present invention relates to media for tape recording systems and Hard Disk Drives (HDDs). More particularly, the present invention relates to a technique for improving media recording performance of tape recording systems and HDDs.

2. Description of the Related Art

Magnetic recording disks are currently made having a continuous magnetic layer that is deposited on a suitable aluminum alloy or glass ceramic substrate. The materials, or media, used for the magnetic layer are generally nickel, cobalt or iron alloys that have been deposited by evaporation or by sputtering to form a magnetic recording layer. Data is written to the magnetic layer by applying a localized magnetic field using a recording head that flies over the surface of the magnetic layer. In perpendicular recording, the media is magnetized perpendicularly to the plane of the disk and each magnetic bit consists of several hundred small grains having a predominant magnetization direction. In longitudinal recording, the magnetization is oriented in the plane of the disk. More recently, other orientations of the magnetization have been proposed to take advantage of the minimum in the Stoner-Wohlfarth switching astroid for different magnetic recording media.

Each grain of a magnetic recording medium ideally has a single magnetization axis such that the magnetization can lie in one of two directions separated by 180 degrees. The magnetization transition between adjacent bits follows a line between the grains of the respective bits. In a perfect medium, the grains on either side of a transition would have opposite magnetization directions. Such a condition would occur only when the grains are subjected to weak magnetic coupling. When the magnetic coupling between two adjacent bits is too great, though, the transition between adjacent bits is poorly defined. Further, the magnetization vectors of each grain within a bit should align in a single direction, which is a state that is more easily obtained when the grains have strong magnetic coupling and is in contrast to the requirement for a weak magnetic coupling for a well-defined transition between adjacent bits. Additionally, thermal fluctuations cause grain magnetization to spontaneously reverse when the volume of the effective magnetic unit is less than a certain minimum, causing loss of data. As the volume of the effective magnetic unit increases, the coupling between grains increases and thereby enhances stability.

It follows that, in view of the conflicting requirements relating to the exchange coupling between adjacent bits and within a given bit and the effects of thermal fluctuations, the degree of coupling between grains is a key parameter that critically affects the performance of a magnetic recording medium. In that regard, the need for controlling exchange coupling between grains is well known. See, for example, U.S. Pat. No. 5,834,085 to Lairson et al.

Recent studies of perpendicular recording media have suggested that the presence of some exchange coupling between grains can lead to an enhancement of the recording performance and thermal stability. Coupled granular/continuous (CGC) media have been proposed as one technique for controlling exchange coupling in a continuous medium. A typical CGC medium consists of a Pt-rich CoCrPt layer having poor Co grain segregation and a thin Pt layer improves the reversal nucleation field of a Co70Cr18Pt12 medium from +420 to −600 Oe. The thermal decay of the signal amplitude from recorded transitions is reduced from 2.23% to 0.10% per decade. Unity squareness has been obtained for a thin Pt capping layer with a magnetization decay rate of 0.21% per decade. See, for example, Y. Sonobe et al., "Thermally Stable CGC Perpendicular Recording Media with Pt-Rich CoPtCr and Thin Pt layers," IEEE Transactions On Magnetics, Vol. 38, No. 5, pp. 2006-2011, September 2002. CGC media having a Co/Pd multilayer capping structure has also been shown to improve thermal stability without compromising SNR. See, for example, Y. Sonobe et al., "Thermal Stability and SNR of Coupled Granular/Continuous Media," IEEE Transactions On Magnetics, Vol. 37, No. 4, pp. 1667-1670, July 2001. Extra layers, however, are required, thereby increasing the medium and deposition tool complexity.

Ion beam treatments have been described for the purpose of improving tribological performance. See, for example, U.S. Pat. No. 6,368,425 to Segar et al. Additionally, ion beam treatments have also been described as a technique for patterning recording media. See, for example, U.S. Pat. No. 6,383,597 to Fullerton et al. Ion beam treatments have also been described in JP 1110757A to K. Akiysau as a technique for producing isolated magnetic grains by a process that forms defects and "micronizes" (or pulverizes) existing grains. Such a known process requires only $10^{10}$ ions/cm$^2$ for H, He, Li, or Be, as compared to >$10^{13}$ ions/cm$^2$ for the technique of the present invention.

What is required is a technique for optimizing the exchange coupling of a perpendicular magnetic recording medium that is independent from the deposition process of the magnetic medium.

BRIEF SUMMARY OF THE INVENTION

The present invention provides a technique for optimizing the exchange coupling of a perpendicular magnetic recording medium that is independent from the deposition process of the magnetic medium.

The advantages of the present invention are provided by a method for controlling exchange coupling of grains of a magnetic medium, such as a magnetic medium having granular magnetic particles on a tape or a disk. First, a magnetic medium having magnetic grains is formed. The magnetic medium can have a perpendicular magnetization, a longitudinal magnetization, or some intermediate direction of magnetization (i.e., a magnetization between a perpendicular magnetization and a longitudinal magnetization). Then, the magnetic medium is irradiated with ions to induce exchange coupling between grains of the magnetic medium. The magnetic medium is irradiated with ions having an acceleration voltage of between 10 keV and 100 keV so that the magnetic medium is exposed to an ion dosage of between $10^{13}$ ions/cm$^2$ and $10^{17}$ ions/cm$^2$ using a non-patterned exposure of the magnetic medium. Alternatively, the magnetic medium is irradiated with ions having an energy that substantially affects an entire thickness of the magnetic medium. According to one aspect of the present invention, the ions can be selected from the group consisting of H$^+$, He$^+$, Ne$^+$, Ar$^+$, Kr$^+$, and Xe$^+$. According to another aspect of the present invention, the ions can be selected from the group consisting of Ga$^+$, Hg$^+$, and In$^+$.

The present invention also provides a magnetic medium that is formed by irradiating the magnetic medium with ions to induce exchange coupling between grains of the magnetic medium using a non-patterned exposure of the magnetic medium. The magnetic medium can be a magnetic medium having granular magnetic particles on a tape or a disk. Further, the magnetic medium can have a perpendicular magnetization or a longitudinal magnetization. According to the present invention, the magnetic medium has been exposed to an ion dosage of between $10^{13}$ ions/cm$^2$ and $10^{17}$ ions/cm$^2$. Additionally, the magnetic medium has been irradiated with ions having an acceleration voltage of between 10 keV and 100 keV. Alternatively, the magnetic medium has been irradiated with ions having an energy that substantially affects an entire thickness of the magnetic medium. According to one aspect of the present invention, the ions can be selected from the group consisting of H$^+$, He$^+$, Ne$^+$, Ar$^+$, Kr$^+$, and Xe$^+$. According to another aspect of the present invention, the ions can be selected from the group consisting of Ga$^+$, Hg$^+$, and In$^+$.

The present invention further provides a method of irradiating a magnetic medium with ions in a non-patterned (e.g., uniform) fashion to increase the areal density of magnetic bits that can be recorded on the medium. The magnetic medium is irradiated with ions having an acceleration voltage of between 10 keV and 100 keV, so that the magnetic medium is exposed, in a non-patterned fashion, to an ion dosage of between $10^{13}$ ions/cm$^2$ and $10^{17}$ ions/cm$^2$. Alternatively, the magnetic medium is irradiated with ions having an energy that substantially affects an entire thickness of the magnetic medium. According to one aspect of the present invention, the ions can be selected from the group consisting of H$^+$, He$^+$, Ne$^+$, Ar$^+$, Kr$^+$, and Xe$^+$. According to another aspect of the present invention, the ions can be selected from the group consisting of Ga$^+$, Hg$^+$, and In$^+$.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The invention provides a technique for improving the recording performance of magnetic media formed by conventional techniques, such as sputter deposition, by exposing the media to ion beam radiation. In particular, the present invention provides a technique of irradiating a Co$_{70}$Cr$_{18}$Pt$_{12}$ granular perpendicular recording media without a soft underlayer using Ar$^+$ and Ga$^+$ ions at acceleration voltages between 10-100 keV (preferably between 20-30 keV). The performance improvement provided by the present invention can be observed based on readback signal measurements of D50, which is the linear density at which signal amplitude is reduced to 50% of its peak value, and based on measurements of PW50, which is the width of a differentiated pulse at half its maximum amplitude.

Figure 1C:
FIGS. 1A-1D show magnetic force microscopy (MFM) images of the AC-demagnetized state for 5 µm×5 µm area of Co$_{70}$Cr$_{18}$Pt$_{12}$ granular perpendicular recording media having varying doses of Ar$^+$ ions/cm$^2$.
Figure 1D:
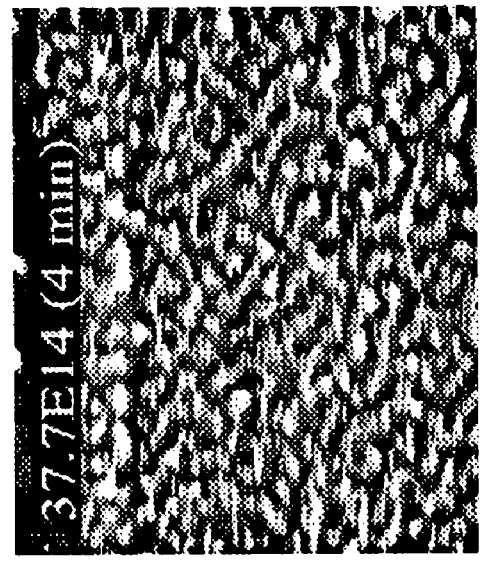
Figure 1A:
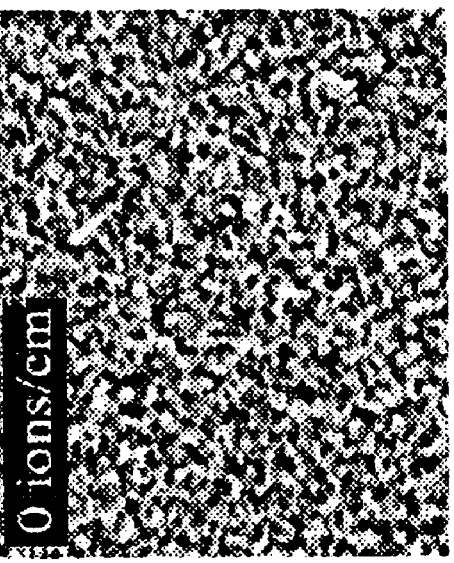
Figure 1B:
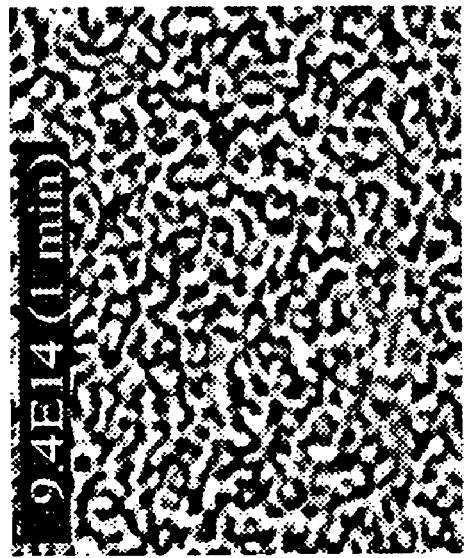

FIGS. 1A-1D are magnetic force microscopy (MFM) images showing that as ion irradiation dose increases, the exchange coupling increases, as shown by an increase in domain size and contrast. More specifically, FIGS. 1A-1D show MFM images of an AC-demagnetized state for a 5 µm×5 µm area of a Co$_{70}$Cr$_{18}$Pt$_{12}$ granular perpendicular recording media having varying doses of Ar$^+$ ions/cm$^2$. FIG. 1A shows an MFM image for a dosage of no Ar$^+$ ions. FIG. 1B shows an MFM image for an Ar$^+$ ion irradiation dosage of 9.4×10$^{14}$ ions/cm$^2$. FIG. 1C shows an MFM image for an Ar$^+$ ion irradiation dosage of 18.8×10$^{14}$ ions/cm$^2$. FIG. 1D shows an MFM image for an Ar$^+$ ion irradiation dosage of 37.7×10$^{14}$ Ar$^+$ ions/cm$^2$. Evolution of the domain structure as a function of increasing level of Ar$^+$ ion irradiation is apparent as greater coupling leads to larger domains. At the highest Ar$^+$ dose (FIG. 1D), the MFM image becomes less clear because the coercivity is sufficiently reduced, thereby allowing the MFM tip to interact with the medium and change the magnetic structure.

Figure 2:
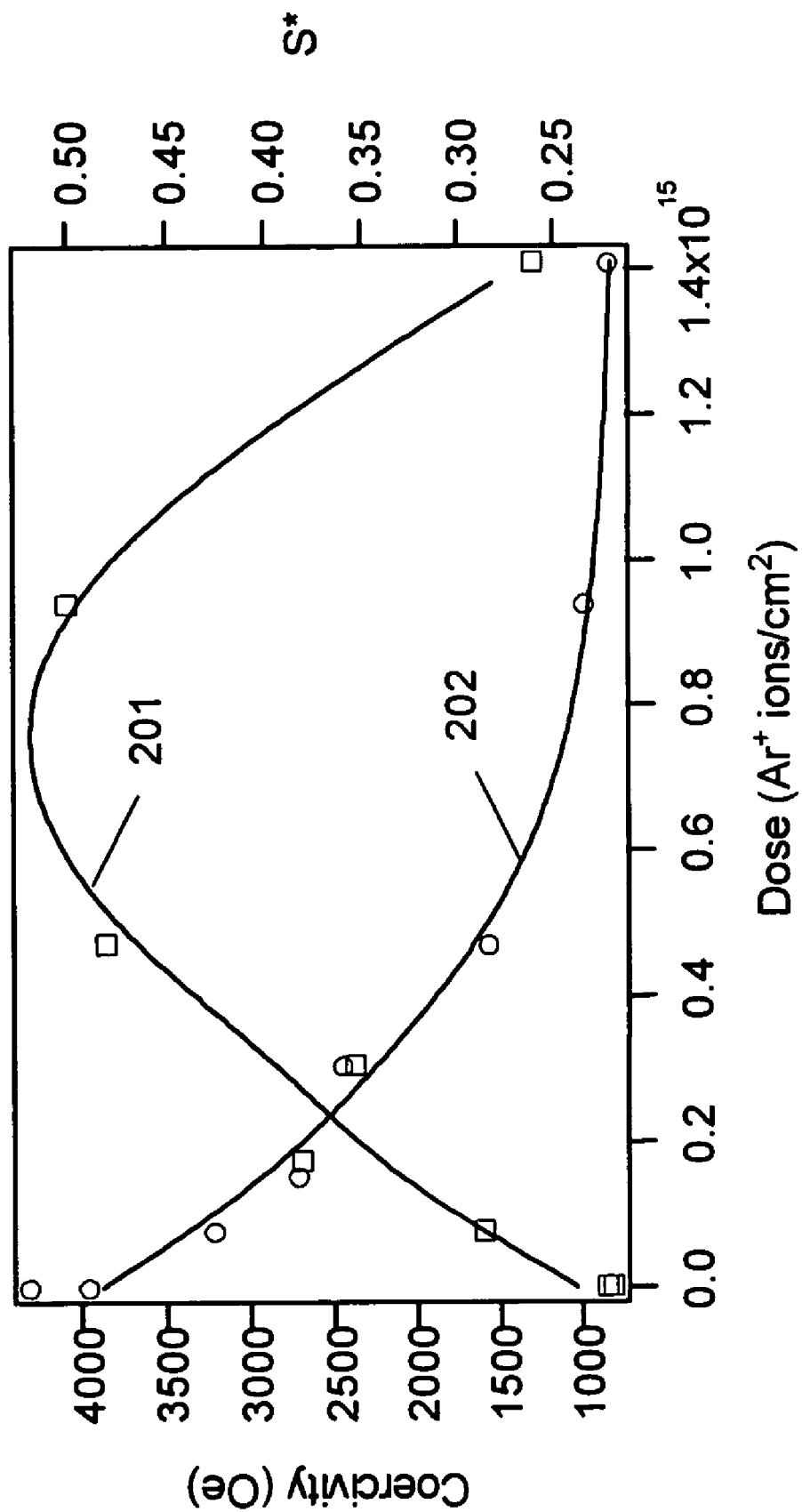
FIG. 2 is a graph respectively showing data for coercivity (curve 201) and S*(curve 202), a measure of the slope of the hysteresis loop close to the coercivity, obtained from polar Kerr rotation measurements on granular Co$_{70}$Cr$_{18}$Pt$_{12}$ perpendicular media as a function of 20 keV Ar$^+$ ion dosage.

The S* parameter obtained from polar Kerr measurements show an initial increase as a function of Ar$^+$ ion irradiation. The S* parameter is a measure of the slope of the hysteresis loop close to the coercivity. The steeper the slope of the hysteresis loop, the larger the S* parameter which indicates a greater exchange coupling. FIG. 2 is a graph respectively showing data for coercivity and S* obtained from polar Kerr rotation measurements on granular Co$_{70}$Cr$_{18}$Pt$_{12}$ perpendicular media as a function of 20 keV Ar$^+$ ion dosage. Data points for coercivity are shown as circles. Data points for S* are shown as squares. Curve 201 indicating coercivity and curve 202 indicating S* in FIG. 2 respectively show the tendencies of coercivity and S* as a function of increasing Ar$^+$ ion dosage. In FIG. 2, S* (curve 202) goes through a maximum as a function of ion dose, whereas coercivity (curve 201) monotonically decreases as a function of ion dose. Both of the MFM measurements (FIGS. 1A-1D) and S* measurements (FIG. 2) indicate increase exchange coupling for low ion doses.

Figure 3:
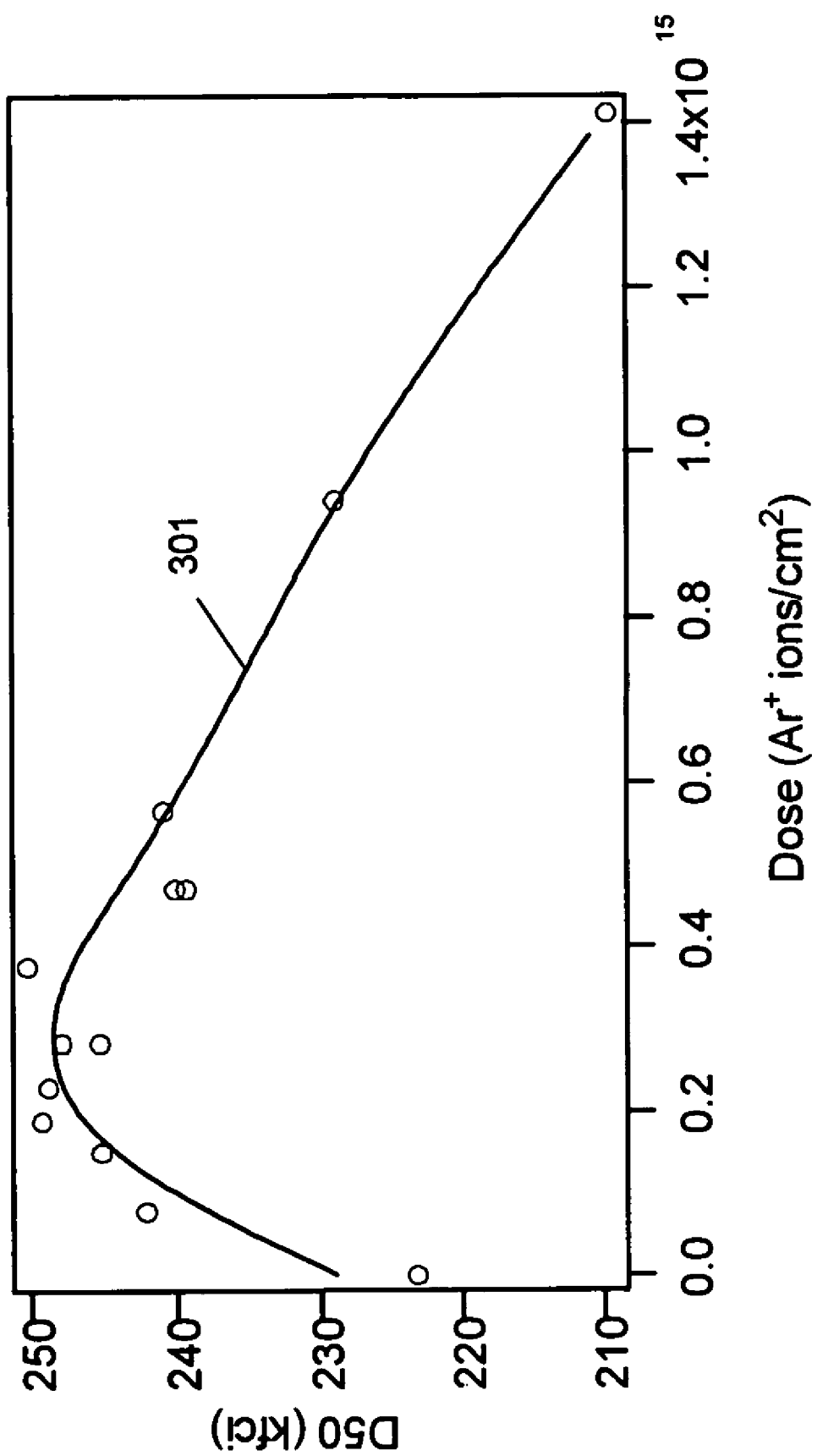
FIG. 3 shows D50 data, the linear density at which signal amplitude is reduced to 50% of its peak value, obtained using a Guzik spinstand measurement for a series of exemplary disks.

Spinstand measurements of signal as a function of linear density provide an indication of the relative recording performance of a medium. The roll off curve can be parameterized using D50, which is the linear density at which the output signal is reduced to half its peak value. FIG. 3 shows D50 data in kilo flux changes per inch (kfci) obtained using a Guzik spinstand measurement for a series of exemplary disks having a granular Co$_{70}$Cr$_{18}$Pt$_{12}$ perpendicular magnetic medium. An increase in D50 of approximately 10% is shown in FIG. 3 for low Ar$^+$ dose, with a maximum occurring for a dose of 3×10$^{14}$ ions/cm$^2$. A further increase in Ar$^+$ irradiation leads to a reduction in D50. Curve 301 in FIG. 3 shows the tendency of the spinstand measurement as a function of increasing $Ar^+$ ion dosage.

Figure 4:
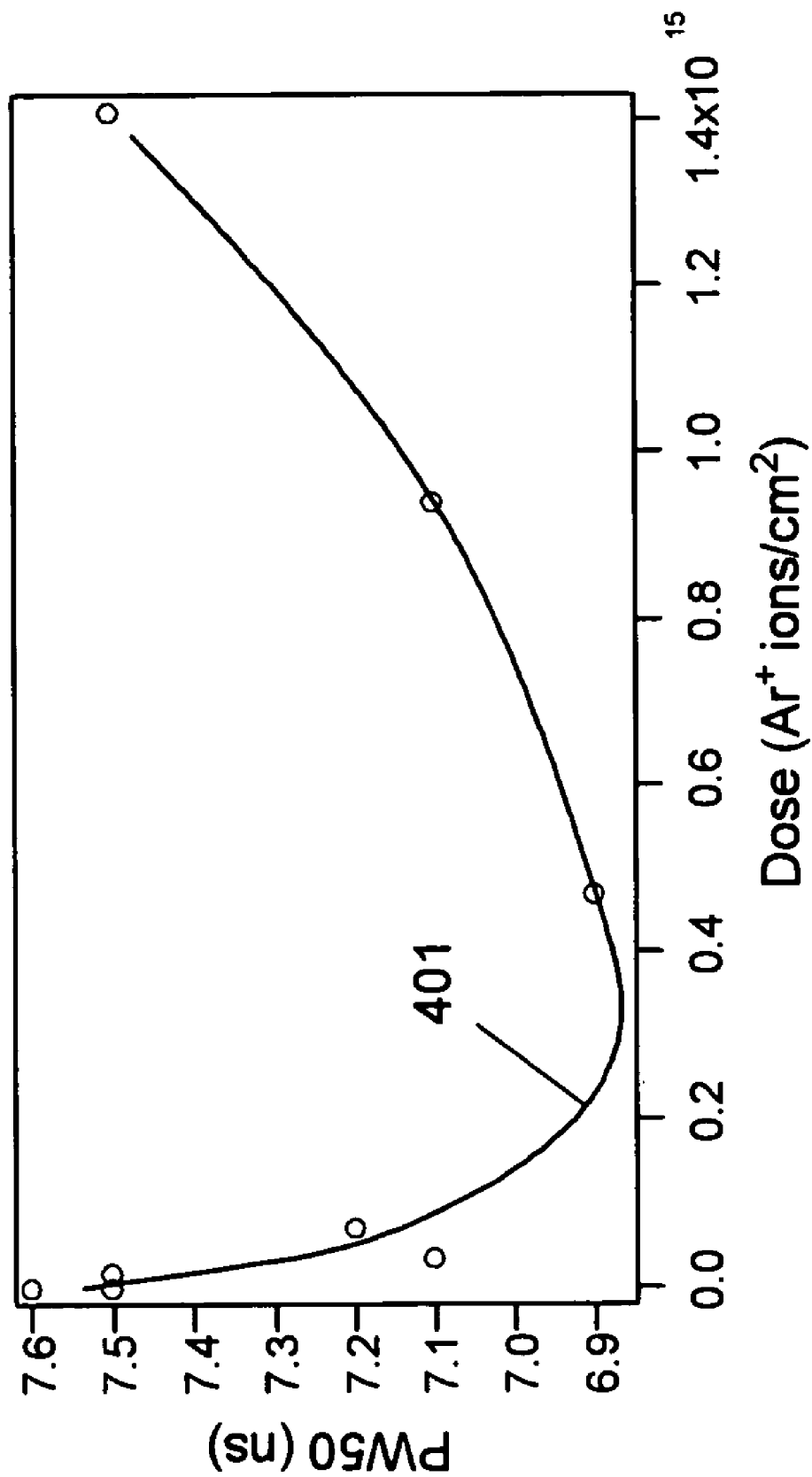
FIG. 4 is a graph showing PW50, the width of a differentiated pulse at half its maximum amplitude, from the readback signal of a perpendicular magnetic medium as a function of increasing Ar$^+$ ion dosage.
Figures 5A, 5B:
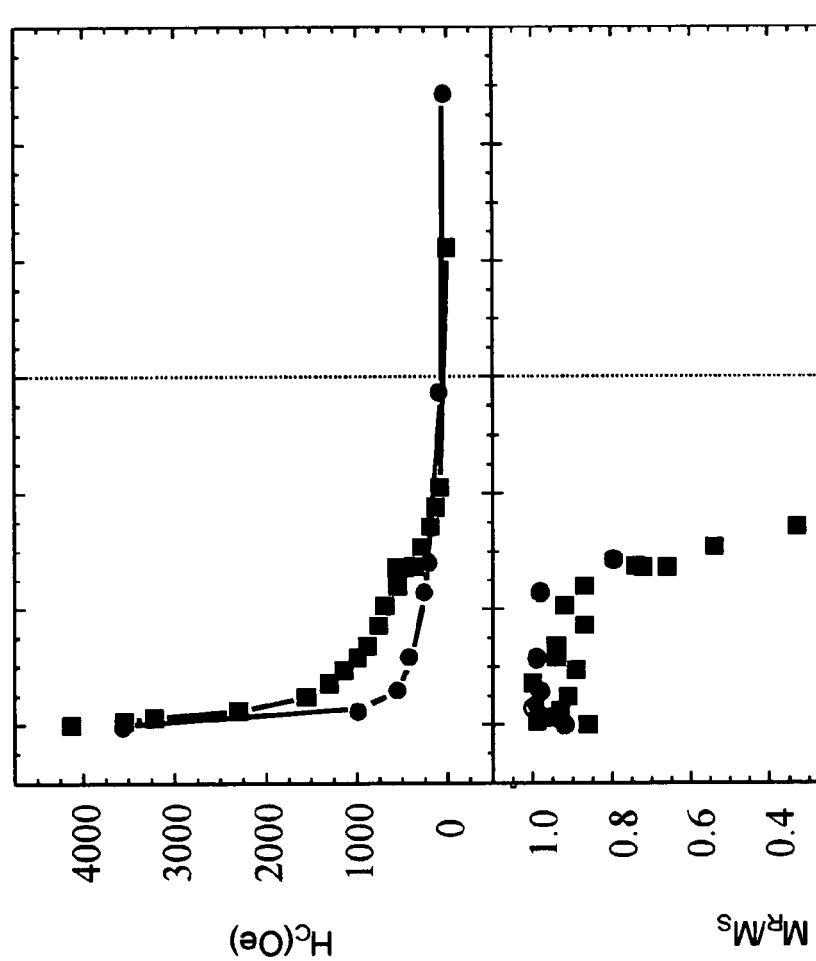
FIGS. 5A and 5B are graphs respectively showing changes in coercivity H$_C$ and remanance M$_R$/M$_S$ resulting from irradiation of a perpendicular magnetic medium with 30 keV Ga+ (square data points) and 20 KeV Ar+ (round data points)

FIG. 4 is a graph showing PW50, which is the width of the differentiated pulse at half its maximum amplitude, from the readback signal of a granular $Co_{70}Cr_{18}Pt_{12}$ perpendicular magnetic medium as a function of increasing $Ar^+$ ion dosage. Curve 401 in FIG. 4 indicates an improvement for PW50 that is similar to the improvement of D50 as a function of increasing $Ar^+$ ion dosage shown in FIG. 3. In particular, PW50 exhibits a minimum for an $Ar^+$ ion dose that corresponds to the $Ar^+$ ion dose for a maximum in D50. The data shown in FIG. 4 were obtained using a Guzik spinstand measurement that was processed on digital oscilloscope. The procedure used resulted in larger error bars than are normally reported, with $\sigma=2$ ns.

The peak in exchange coupling (shown in FIG. 2) occurs for greater $Ar^+$ dose than for the maximum in D50 (shown in FIG. 3) and the minimum in PW50 (shown in FIG. 4). Accordingly, the differences in the dosage amount between the respective maxima and minima suggests that excess exchange coupling leads to a reduction in recording performance. It should, however, also be noted that the coercivity is changing significantly over the dosage range of FIGS. 2-4 and it may be equally valid to hypothesize that a reduction in coercivity leads to a reduction in D50 and increase in PW50 at higher $Ar^+$ doses.

Regardless, given either mechanism, a recording medium performance advantage is obtained when the medium is subjected to $Ar^+$ ion irradiation. Thus, the present invention provides a technique for controlling exchange coupling in magnetic media, thereby optimizing recording medium performance properties, based on subjecting the magnetic recording medium to an accumulated dose of $Ar^+$ ion irradiation. Ar gas can be ionized to create $Ar^+$ ions for irradiating a magnetic medium according to the present invention. Other gases that can be used for the present invention and that are commonly used to make ion beams include $H^+$, $He^+$, $Ne^+$, $Kr^+$, and $Xe^+$. With the exception of $H^+$, these gases are chemically inert and do not react with the ionizer or the sample.

Experiments using 30 keV $Ga^+$ provide results that are very similar to the results obtained using 20 KeV $Ar^+$, as shown by FIGS. 5-8. Liquid Ga can be used for generating $Ga^+$ ions. Other liquid metal sources that can be used for the present invention and that are suitable for producing focused beams include $Hg^+$, and $In^+$. FIGS. 5A and 5B are graphs respectively showing changes in coercivity $H_C$ and remanance $M_R/M_S$ resulting from irradiation of a perpendicular magnetic medium with 30 keV $Ga^+$ and 20 KeV $Ar^+$. Data for $Ga^+$ is shown as square data points. Data for $Ar^+$ is shown as round data points. Note that 1 $nC/\mu m^2=6.25\times10^{17}$ ions/$cm^2$.

Figure 6:
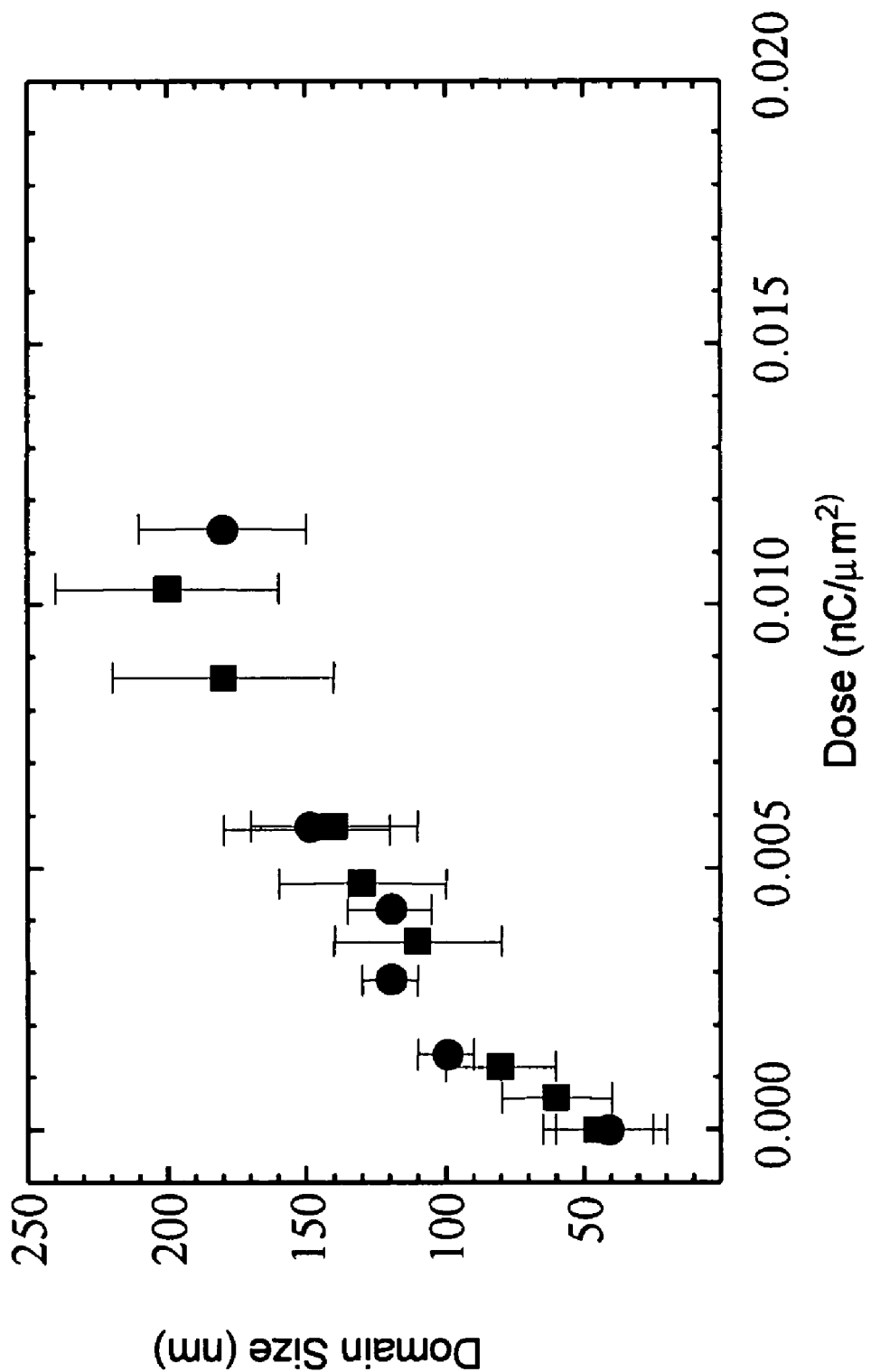
FIG. 6 shows a graph of domain size of a perpendicular magnetic medium measured with MFM as a function of 30 keV Ga+ ion dosage (square data points) and of 20 KeV Ar+ ion dosage (round data points)

FIG. 6 shows a graph of domain size of a perpendicular magnetic medium measured with MFM as a function of 30 keV $Ga^+$ ion dosage and of 20 KeV $Ar^+$ ion dosage. Data for $Ga^+$ is shown as square data points. Data for $Ar^+$ is shown as round data points. As with coercivity and $M_r/M_s$, shown in FIGS. 5A and 5B, the changes in domain size are very similar for both $Ga^+$ and $Ar^+$ irradiation. Note that 0.005 $nC/\mu m^2=3.1\times10^{15}$ ions/$cm^2$.

Figure 7:
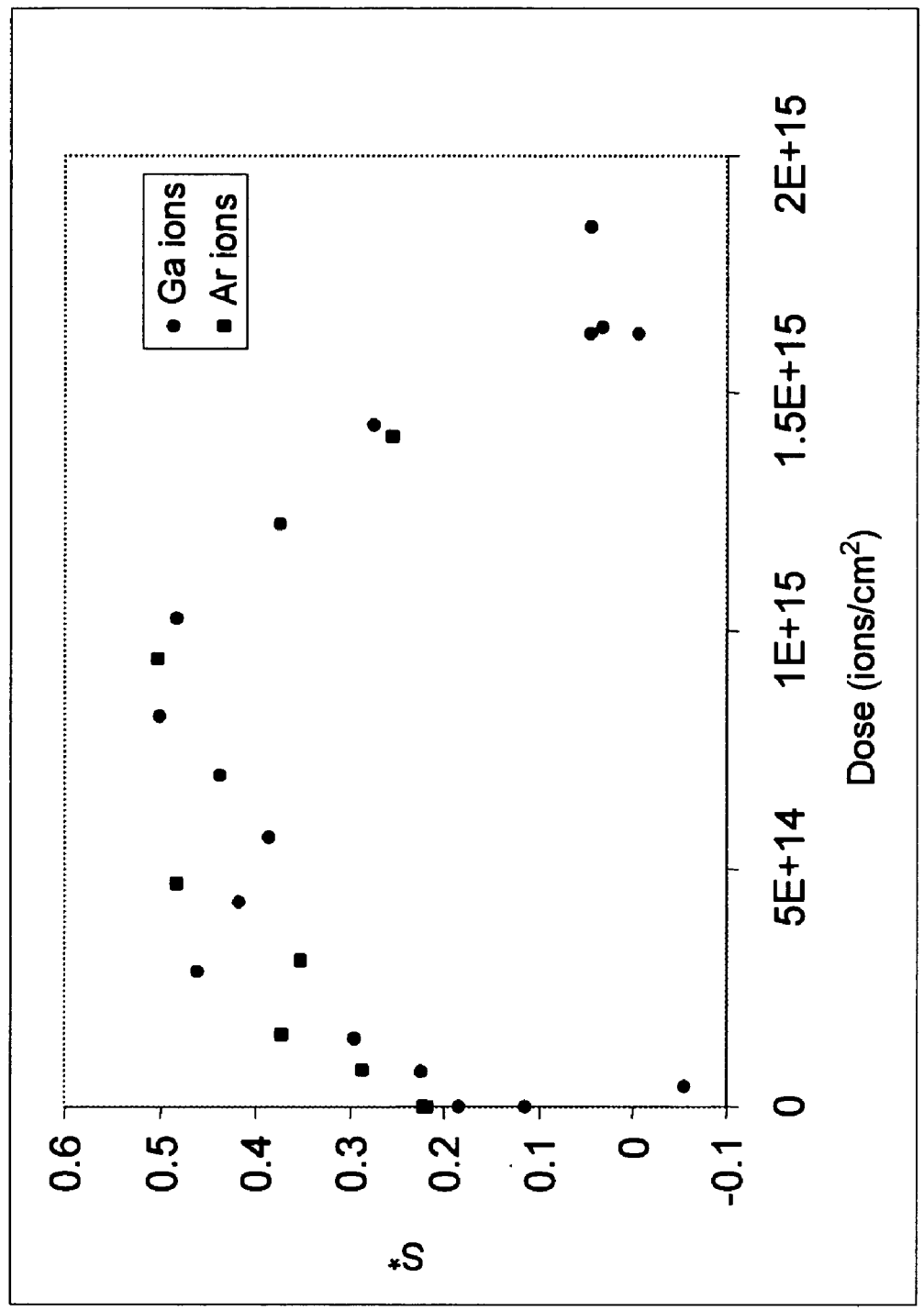
FIG. 7 is a graph showing variations of S* as a function of 30 keV Ga+ and 20 keV Ar+ ion dosage.

FIG. 7 is a graph showing variations of S* as a function of 30 keV $Ga^+$ and 20 keV $Ar^+$ ion dosage. Data for $Ga^+$ is shown as round data points. Data for $Ar^+$ is shown as square data points.

Figure 8:
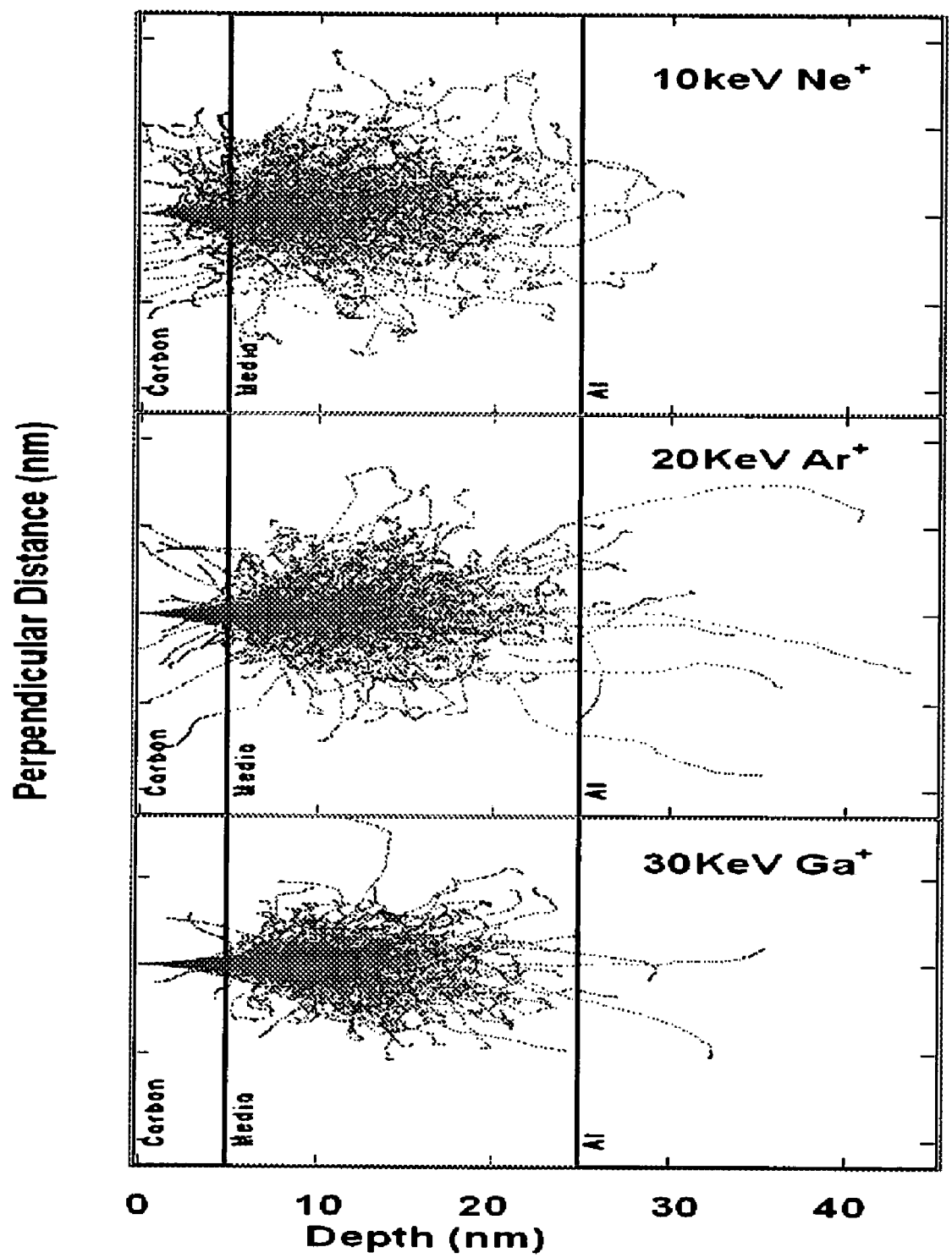
FIG. 8 shows simulation results of ion beam damage that are produced in Co$_{70}$Cr$_{18}$Pt$_{18}$ by 10 keV Ne$^+$, 20 KeV Ar$^+$, and 30 keV Ga$^+$.

FIG. 8 shows simulation results of ion beam damage that are produced in $Co_{70}Cr_{18}Pt_{18}$ by 10 keV $Ne^+$, 20 KeV $Ar^+$, and 30 keV $Ga^+$. The simulations were carried out using a Monte-Carlo based code known as SRIM. See, for example, J. F. Ziegler et al., "The Stopping and Range of Ions in Solids," Pergamon Press, New York, 1985. The SRIM software that was used for the simulations is available from http://www.srim.org/. The extent of the damage is similar for each of these different ions. The difference in size and mass of the different ions shown in FIG. 8 is compensated by changing the energy. The dose required for the same amount of damage, however, decreases with increasing ion mass. For example, 10 keV $Ne^+$ produces only about ⅓ as much damage (i.e., defects) per ion as 30 keV $Ga^+$.

The advantage of magnetic recording medium performance enhancement is not dependent on the level of ion current, only the accumulated dose. In one series of experiments using $Ar^+$, results obtained using currents differing by more than a factor of three agreed well when magnetic recording mediums were exposed at the same dose, i.e., the low current case involved an exposure that was over three times longer.

Up to this point in the disclosure of the present invention, the focus has been on a magnetic recording medium having a perpendicular magnetization. It should be understood that the present invention is applicable to magnetic recording mediums having a longitudinal magnetization.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling exchange coupling of grains of a magnetic medium, the method comprising:
    providing a magnetic medium having magnetic grains; and
    irradiating the magnetic medium with ions having an acceleration voltage of between 10 keV and 100 keV to induce exchange coupling between grains of the magnetic medium, the ions being selected from the group consisting of $Hg^+$ and $In^+$.

2. The method according to claim 1, further comprising ionizing a gas to create the ions.

3. The method according to claim 1, further comprising generating the ions from a liquid metal ion source.

4. The method according to claim 1, wherein irradiating the magnetic medium irradiates the magnetic medium with ions having an acceleration voltage of between 20 keV and 30 keV.

5. The method according to claim 1, wherein irradiating the magnetic medium irradiates the magnetic medium with ions having an energy that substantially affects an entire thickness of the magnetic medium.

6. The method according to claim 1, wherein the magnetic medium includes granular magnetic particles on a tape.

7. The method according to claim 1, wherein the magnetic medium includes granular magnetic particles on a disk.

8. The method according to claim 1, wherein the magnetic medium has a perpendicular magnetization.

9. The method according to claim 1, wherein the magnetic medium has a longitudinal magnetization.

10. The method according to claim 1, wherein the magnetic medium has a magnetization between a perpendicular magnetization and a longitudinal magnetization.

11. The method according to claim 1, wherein irradiating the magnetic medium includes exposing the magnetic medium to an ion dosage of between $10^{13}$ ions/$cm^2$ and $10^{17}$ ions/$cm^2$.

12. The method according to claim 1, wherein irradiating the magnetic medium includes exposing the magnetic medium to ions using a non-patterned exposure of the magnetic medium.

13. The method according to claim 1, wherein the irradiating is performed to increase the areal density of magnetic bits that can be recorded on the medium.

14. A method, comprising:
provacing a magnetic medium having magnetic grains; and
irradiating the magnetic medium with ions having an acceleration voltage of between 10 keV and 100 keV, in a non-patterned fashion, to increase an areal density of magnetic bits that can be recorded on the medium, the ions being selected from the group consisting of $Hg^+$ and $In^+$.

15. The method according to claim 14, wherein irradiating the magnetic medium irradiates the magnetic medium with ions having an acceleration voltage of between 20 keV and 30 keV.

16. The method according to claim 14, wherein irradiating the magnetic medium irradiates the magnetic medium with ions having an energy that substantially affects an entire thickness of the magnetic medium.

17. The method according to claim 14, wherein irradiating the magnetic medium includes exposing the magnetic medium to an ion dosage of between $10^{13}$ ions/cm$^2$ and $10^{17}$ ions/cm$^2$.

* * * * *